(12) United States Patent
Mason

(10) Patent No.: US 9,145,308 B2
(45) Date of Patent: Sep. 29, 2015

(54) OIL SPILL CLEANUP FROM WATER

(75) Inventor: Gary J. Mason, Camberley (GB)

(73) Assignee: Fluor Technologies Corporation, Aliso Viejo, CA (US)

(*) Notice: Subject to any disclaimer, the term of this patent is extended or adjusted under 35 U.S.C. 154(b) by 642 days.

(21) Appl. No.: 13/349,989

(22) Filed: Jan. 13, 2012

(65) Prior Publication Data

US 2013/0180900 A1    Jul. 18, 2013

(51) Int. Cl.
*C02F 1/40* (2006.01)
*E02B 15/10* (2006.01)
*E02B 15/04* (2006.01)
*E02B 15/06* (2006.01)
*E02B 15/08* (2006.01)

(52) U.S. Cl.
CPC .................. *C02F 1/40* (2013.01); *E02B 15/048* (2013.01); *E02B 15/06* (2013.01); *E02B 15/106* (2013.01); *E02B 15/0814* (2013.01); *Y10S 210/923* (2013.01)

(58) Field of Classification Search
CPC ...... E02B 15/045; E02B 15/08; E02B 15/106
See application file for complete search history.

(56) References Cited

U.S. PATENT DOCUMENTS

| | | | |
|---|---|---|---|
| 3,532,219 A * | 10/1970 | Valdespino | 210/242.3 |
| 3,703,811 A * | 11/1972 | Smith | 405/68 |
| 3,722,687 A | 3/1973 | Stebbins et al. | |
| 3,724,662 A * | 4/1973 | Ortiz | 405/65 |
| 4,226,711 A | 10/1980 | Cain et al. | |
| 4,595,510 A | 6/1986 | Winbladh et al. | |
| 4,963,272 A * | 10/1990 | Garrett | 210/776 |
| 5,080,783 A | 1/1992 | Brown | |
| 5,478,168 A * | 12/1995 | Carr et al. | 405/68 |
| 8,025,460 B2 | 9/2011 | Cobb | |
| 8,048,300 B1 | 11/2011 | Ness et al. | |
| 8,628,658 B2 * | 1/2014 | Giovannitti et al. | 210/170.05 |
| 2011/0253642 A1 | 10/2011 | Lundin | |
| 2011/0266200 A1 | 11/2011 | Day et al. | |
| 2011/0284450 A1 | 11/2011 | Chadwick et al. | |
| 2011/0287929 A1 | 11/2011 | Smith et al. | |
| 2011/0293372 A1 | 12/2011 | Later | |
| 2011/0293373 A1 | 12/2011 | Hubbell, Jr. | |
| 2011/0293376 A1 | 12/2011 | Goulet | |
| 2011/0297608 A1 | 12/2011 | Crouse | |

(Continued)

FOREIGN PATENT DOCUMENTS

| CA | 1109806 | 9/1981 |
|---|---|---|
| CN | 202047404 | 11/2011 |

(Continued)

*Primary Examiner* — Terry Cecil
(74) *Attorney, Agent, or Firm* — Fish & Tsang LLP

(57) ABSTRACT

An oil spill cleanup device is described. The device includes a container and at least one flexible hollow elongated member extending from the container. The device floats in water and can be used to collect and separate oil from the contaminated water. Water is collected by the elongated member, which has several exterior one-way valves that allow contaminated water to enter the member. The contaminated water is pushed towards and into the container by the wave motions of the surrounding water. The elongated member has internal one-way valves that help to direct the contaminated water towards the container. Once in the container, the contaminated water can separate into water and oil due to differences in specific gravity. Multiple devices can be connected together to form a barrier for containing the contaminated water within a limited area.

19 Claims, 3 Drawing Sheets

(56) References Cited

U.S. PATENT DOCUMENTS

| | | |
|---|---|---|
| 2011/0297621 A1 | 12/2011 | Crouse |
| 2011/0299931 A1 | 12/2011 | Schaus |
| 2011/0303613 A1 | 12/2011 | Crouse |
| 2011/0303616 A1 | 12/2011 | Cox et al. |
| 2011/0309006 A1 | 12/2011 | Crouse |
| 2011/0309031 A1 | 12/2011 | Hawthorne |
| 2011/0311310 A1 | 12/2011 | Morrison, Jr. |

FOREIGN PATENT DOCUMENTS

| | | |
|---|---|---|
| GB | 1314912 A * | 4/1973 |
| GB | 2480858 | 12/2011 |
| JP | 03129008 A * | 6/1991 |
| WO | 2006/061453 | 6/2006 |
| WO | 2011/139475 | 11/2011 |
| WO | 2011/139650 | 11/2011 |
| WO | 2011/143276 | 11/2011 |
| WO | 2011/146656 | 11/2011 |
| WO | 2011/150043 | 12/2011 |
| WO | 2011/150504 | 12/2011 |
| WO | 2011/152836 | 12/2011 |
| WO | 2011/153022 | 12/2011 |
| WO | 2011/158773 | 12/2011 |
| WO | 2011/159968 | 12/2011 |
| WO | 2011/160999 | 12/2011 |
| WO | 2011/163097 | 12/2011 |
| WO | 2011/163239 | 12/2011 |
| WO | 2011/163383 | 12/2011 |
| WO | 2011/163573 | 12/2011 |

* cited by examiner

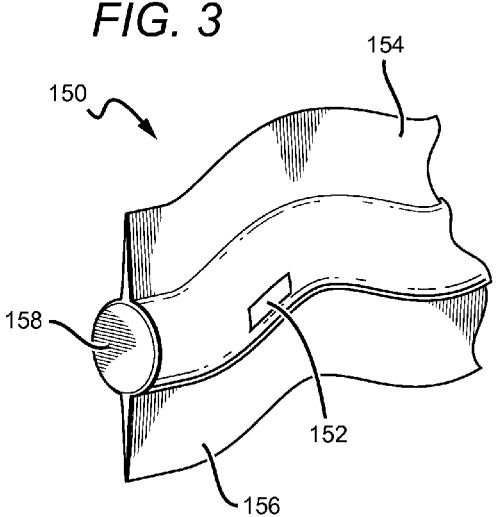
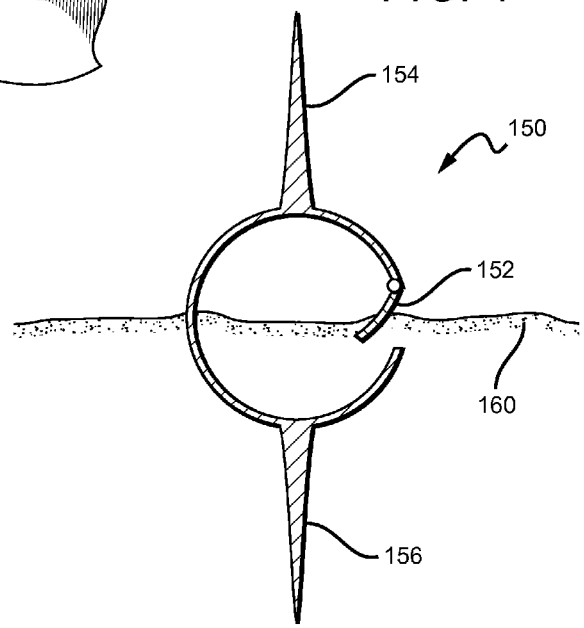
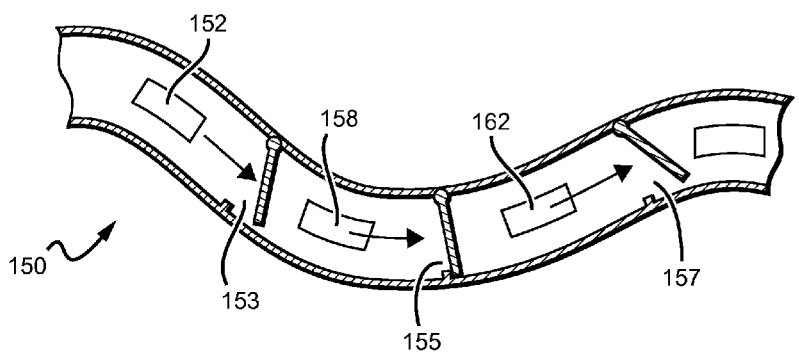

OIL SPILL CLEANUP FROM WATER

FIELD OF THE INVENTION

The field of the invention is oil spill cleanup.

BACKGROUND

The damage caused by ocean oil spills is well known. Oil spills can have a devastating effect on ecological systems and a long lasting impact on the environment. Great effort has been spent on developing effective cleanup methods and devices for oil spills.

One approach is to contain the oil using a barrier, such as nets, booms, and tents. See for example: U.S. Pat. No. 8,025, 460, US20110253642, US20110293373, US20110293376, US20110297621, US20110299931, US20110309006, US20110311310, WO2011139650, WO2011152836, and WO2011163383. However, even if the oil is effectively contained, it must still be removed from the water.

One known method for removing surface oil from water is by using a special vessel called a "skimmer," which is specifically designed to collect and separate oil from the surface of water. Examples of skimmers include: U.S. Pat. No. 8,048, 300, US20110297608, US20110303613, US20110303616, US20110309031, WO2011150043, and WO2011158773. While skimmers are useful in some aspects, various disadvantages remain. First, many skimmers do not operate well in choppy water. Second, some skimmers do not collect oil if the oil is too thin. Third, skimmers require significant energy and human-time since the vessel must be constantly driven or towed through the water in order to collect oil. Fourth, skimmers are expensive, limited in number, and difficult to transport to a cleanup site.

Another known approach to removing oil from water is to place oil-absorbent materials in the contaminated water. See, for example, US20110284450, US20110287929, US20110293373, WO2011139475, WO2011146656, WO2011150504, and WO2011159968. While absorbent materials have some useful aspects, this method does not provide a way to recover the oil for use. Rather, the sorbent materials are thrown away in a landfill, creating additional harm to the environment. Moreover, some absorbent pads break down if left in water too long.

Yet another approach is to draw contaminated water into a floating container using a suction mechanism and allow the oil to separate from the water due to their differences in specific gravity. GB2480858 to Peck, for example, describes a floating collection device that has an engine and a suction mechanism. The suction mechanism brings water and oil into the separator, and the oil is allowed to rise to the top of the container while the water drops down and out the open bottom of the container. Similarly, US20110266200 to Day describes a floating container that includes a motor and a fan. The fan draws water into the container so that oil can be removed. While these approaches advantageously allow for passive (i.e., minimal human involvement) collection and separation of oil, they require a significant amount of energy to run the motors/engines for the suction mechanisms. Furthermore, the suction systems can clog and breakdown from debris.

These and all other extrinsic materials discussed herein are incorporated by reference in their entirety. Where a definition or use of a term in an incorporated reference is inconsistent or contrary to the definition of that term provided herein, the definition of that term provided herein applies and the definition of that term in the reference does not apply.

It has yet to be appreciated that oil can be contained in one area and separated from water using a passive and low-energy approach. Thus, there is still a need for improved methods and devices for containing and removing oil from the surface of water.

SUMMARY OF THE INVENTION

The inventive subject matter provides apparatus, systems, and methods in which an oil spill cleanup device includes a water-buoyant container with an elongated member extending from the container. The container defines a lumen for containing contaminated water (e.g., a water-oil mixture). The container acts as a separator, allowing oil to rise and water to fall due to their different specific gravities. The container also has an opening at the bottom, which allows the separated water to exit into the surrounding water.

The elongated member extending from the container is flexible, hollow, and floats along the surface of the contaminated water. The elongated member has an exterior one-way valve that allows contaminated water to enter the interior hollow area of the elongated member. Interior one-way valves within the hollow area direct the contaminated water to the container. The flexibility of the elongated member allows the elongated member to bend with the waves of the body of contaminated water. The wave motion helps to direct the contaminated water within the hollow area towards the container. The elongated member also has an end that is configured to removeably couple with a receiving portion of a second oil spill cleanup device. The receiving portion includes a one-way valve and a fastener for removeably coupling with the end of the elongated member. In this manner, multiple oil spill cleanup devices can be connected together to form a barrier.

In one aspect of some embodiments, the container has a closable opening that provides access to the oil within the container. A pump can be coupled with the closable opening to remove oil from the container.

In another aspect of some embodiments, the elongated member has a top fin and a bottom fin. The fins are configured to provide a barrier, thus preventing surface oil from passing across the elongated member. The bottom fin is also weighted in order to maintain the proper orientation of the elongated member while floating in a body of turbulent water.

Various objects, features, aspects and advantages of the inventive subject matter will become more apparent from the following detailed description of preferred embodiments, along with the accompanying drawing figures in which like numerals represent like components.

BRIEF DESCRIPTION OF THE DRAWING

FIG. 3 is a close-up perspective view of the elongated member of the oil spill cleanup device of FIG. 1.

FIG. 4 is a cross section view of the elongated member of FIG. 3.

FIG. 5 is another cross section view of the elongated member of FIG. 3.

DETAILED DESCRIPTION

One should appreciate that the disclosed techniques provide many advantageous technical effects including methods and devices for separating oil from water and containing the oil for pickup.

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

Figure 1:
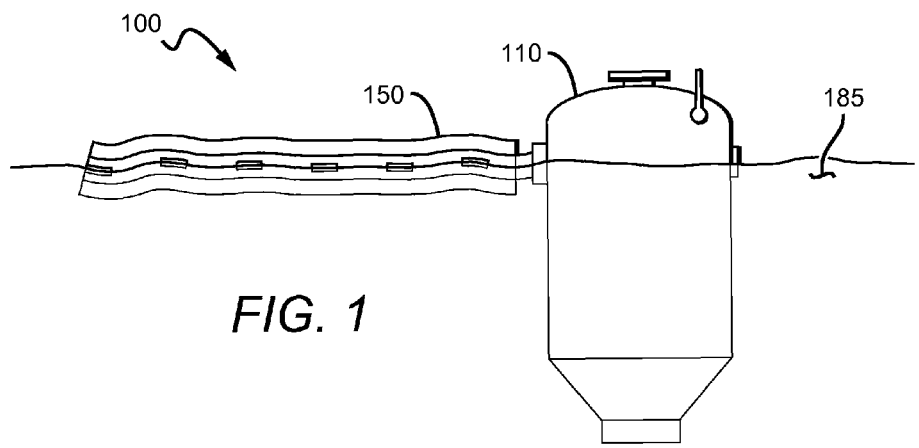
FIG. 1 is a perspective view of one embodiment of an oil spill cleanup device floating in a turbulent body of water.

FIG. 1 shows an oil spill cleanup device 100, which comprises a container 110 and an elongated member 150 extending from container 110. Device 100 is floating in a turbulent body of contaminated water 185. Device 100 is useful for collecting contaminated water and allowing oil to separate from the water. Device 100 is also useful for establishing a barrier to contain contaminated water within a limited area. Device 100 will be discussed in more detail in FIGS. 2-5.

Figure 2:
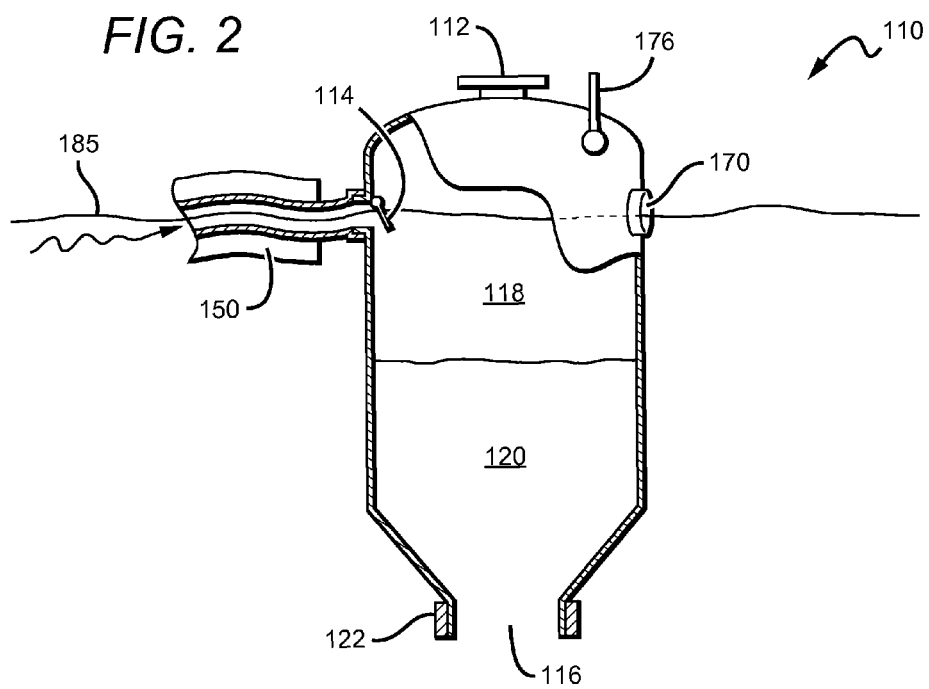
FIG. 2 is a cross section view of the oil spill cleanup device of FIG. 1.

FIG. 2 shows a side view of container 110. Container 110 is a water-buoyant structure having a cylindrical shape. Container 110 is weighted such that it floats vertically in water. Weights 122 are included to achieve the proper orientation of container 110 in water 185. The shape and orientation of container 110 can be varied according to the particular application. For example, container 110 could alternatively be shaped as a square, sphere, triangle, or even irregular. Container 110 could also be configured to float horizontally or diagonally in water. Those of skill in the art will appreciate that many variations in the shape and orientation of container 110 can be used consistently with the inventive subject matter disclosed herein. Furthermore, the size of container 110 could be varied according to the size of the oil spill and contaminated body of water.

Container 110 can be made of any combination of materials, including but not limited to, metals, composites, plastics, and ceramics, so long as it is buoyant and substantially impermeable to water and oil. Container 110 is preferably rigid or semi-rigid; although it is contemplated that container 110 may include non-rigid surfaces, portions, and/or components. Container 110 can be either transparent or opaque. Container 110 is preferably made of a material that is light and resistant to salt water corrosion. Furthermore, container 110 can be one integral component or an assembly of multiple components. In some embodiments, container 110 comprises multiple components that can be quickly dissembled and reassembled for transporting.

Contaminated water 185 flows into container 110 via elongated member 150 and interior one-way valve 114. Once inside container 110, contaminated water 185 separates into oil 118 and water 120 due to different specific gravities. In some embodiments, an insert having a specific gravity between that of oil and water can be disposed inside the lumen of container 110 to act as a barrier between oil 118 and water 120. Valve 114 prevents separated oil 118 from exiting container 110. Opening 116 allows water 120 to exit container 110 as oil 118 increases in volume. While FIG. 2 shows opening 116 as having a smaller diameter than the body of container 110, those of skill in the art will appreciate that different configurations and embodiments of opening 116 can be used consistently with the inventive subject matter disclosed herein.

Container 110 has a closable opening 112, which comprises an opening and a screw-on lid. Closable opening 112 provides access to the lumen of container 110 for removing oil 118. For example, a pump could be inserted into oil 118 via closable opening 112 and oil 118 can be moved to a vessel for transportation. Closable openings are well known and those of skill in the art will appreciate that many different configurations can be used consistently with the inventive subject matter disclosed herein. For example, alternative embodiments for closable openings could include: corks, snap-on lids, hatches, valves with dip pipes, and sliding lids. The location of closable opening 112 can be altered depending on the transport vessel. For example, closable opening 112 could be located on a side surface of container 110 and even below the water level.

Container 110 also preferably has a receiving portion 170, which comprises an opening surrounded by a rim. Receiving portion 170 is configured to removeably couple with an end of an elongated member (e.g., end 158 in FIG. 3), thus allowing multiple oil spill cleanup devices 100 to be connected in series. Removable couplings are well known and may include, but are not limited to, latch fasteners, press-fit couplings, thread-screw couplings, hook-and-look fasteners, and male-female engaging fasteners. Depending on the type of removable coupling, the rim of receiving portion 170 could be replaced by some other fastening means for removeably coupling with an end of an elongated member. In addition, receiving portion 170 could also be configured to couple with a pump, thus eliminating the need for closable opening 112. It is further contemplated that receiving portion 170 could include a removable cover to prevent the intake of water when portion 170 is not coupled with an elongated member.

Container 110 can further include an indicator 176 for indicating how much oil is inside container 110. One embodiment of an indicator could comprise a dipstick that is configured to float in water and sink in oil. As the level of oil increases, the dipstick sinks Markings on the dipstick can be used to indicate the oil level. Other embodiments for an indicator could include electronic means. For example, sensors configured to sense the presence of oil can be included within container 110. The sensors provide a signal that can be interpreted into an amount of oil present within container 110. Yet another embodiment of an indicator could simply comprise a transparent portion on container 110 (e.g., a side or top window) to observe the contents of container 110.

Container 110 can also include electronics for measuring and tracking the amount of oil that has been removed from container 110. For example, a flow rate sensor could be placed within opening 112.

It is further contemplated that container 110 could include an anchoring system to maintain a position of the container within a body of water. Anchor systems are well known and any system suitable for the local conditions can be used.

FIG. 3 shows a close-up perspective view of elongated member 150. Member 150 has a one-way exterior valve 152 that allows contaminated water 185 and oil layer 160 (see FIG. 4) to enter the hollow interior of member 150. End 158 can also include a one-way valve to allow water to enter member 150. Alternatively, end 158 could be a closed end. In preferred embodiments, end 158 is configured to mate with receiving portion 170. For example, end 158 could include internal threads that mate with external threads of receiving portion 170. Alternatively, end 158 could include features that engage a latch on receiving portion 170. Removable couplings are well known and many different configurations can be used to couple end 158 with receiving portion 170 (e.g., clamps, press-fits, male-female engagements, etc.).

Elongated member 150 can be made of any material that is substantially impermeable to water and oil and is flexible enough to bend with waves in a turbulent body of water (e.g., see FIG. 5). In some embodiments, member 150 is made of an elastomer (e.g., a rubber hose). Member 150 is preferably buoyant in both fresh and salt water. The appropriate buoyancy can be provided either by the principle materials of member 150 or by attaching sufficiently buoyant material to member 150.

FIG. 4 shows a cross section of the elongated member 150. Member 150 has a substantially circular cross section shape. Those of skill in the art will appreciate that non-circular cross sectional shapes could also be used consistently with the inventive subject matter (e.g., rectangular, triangular, square, or irregular). Member 150 has an upper fin 154 and a lower fin 156. Fin 154 is appropriately sized and dimensioned to provide a barrier, keeping contaminated water 185 from splashing and passing across the top of member 150. For example, the height of fin 154 could be selected based on the amount of turbulence that occurs in the body of water in which device 100 is used. Member 150 can include anchors to prevent fin 154 from dragging member 150 in windy conditions. Fin 156 is also appropriately sized and dimensioned to provide a barrier, keeping oil layer 160 from passing under member 150. In addition, fin 156 is sufficiently weighted such that the orientation of member 150 in water 185 is maintained.

Valve 152 is disposed on a side of member 150 that is intended to face a body of contaminated water 185. In other words, member 150 has exterior valves along only one side of its sides so that only contaminated water from that side of member 150 enters container 110. This configuration is useful when oil spill cleanup device 100 is used as a barrier to contain contaminated water 185 within a particular zone. However, when oil spill cleanup device 100 is used in the middle of a body of contaminated water 185, member 150 can include exterior valves on all sides in order to collect water from all directions.

FIG. 5 shows a side view of elongated member 150. Member 150 is flexible and experiences undulation from the waves in contaminated water 185. Member 150 has a plurality of exterior valves 152, 158, 162, which allow contaminated water to enter the hollow interior of member 150. Once inside member 150, the contaminated water is pushed along member 150 and into container 110 by (i) the undulating forces experienced by member 150 in choppy water and (ii) a plurality of interior one-way valves 153, 155, 157. In other words, the up and down motion of member 150 in a body of turbulent water causes the contaminated water 185 within member 150 to advance through each interior one-way valve until it finally reaches container 110. In this manner, contaminated water is collected and separated without the need for a suction mechanism (e.g., pump, fan, motor). However, it is contemplated that member 150 could additionally include a suction mechanism that can be operated when contaminated water 185 is calm. For example, member 150 could also include a plurality of interior fans and sensors (e.g., motion sensor or flow-rate sensor) that activates the fans when contaminated water 185 is not turbulent enough to push water through member 150. The fans could be solar powered to provide stand-alone operation.

The advantages of device 100 and related devices are many. Device 100 provides a low-energy passive means for containing, collecting, and separating oil from water. In addition, device 100 can be easily manufactured using inexpensive materials. Device 100 can also be deployed rapidly during an emergency. Yet still, device 100 can be manufactured in components to allow for disassembly and efficient storage.

Figure 6:
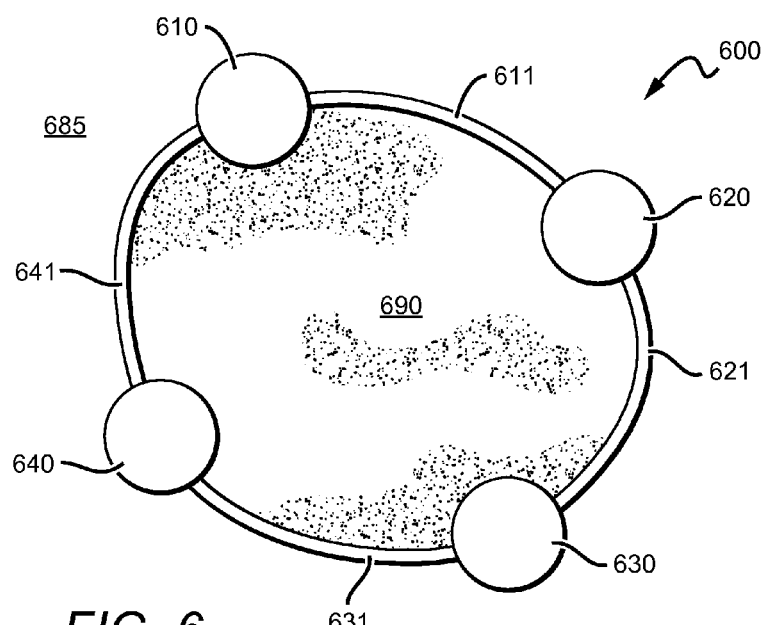
FIG. 6 is an aerial view of four oil spill cleanup devices coupled together to form a barrier encircling a body of contaminated water.

FIG. 6 shows an aerial view of an oil container system 600, comprising four oil spill cleanup devices 610, 620, 630, 640 floating in a turbulent body of contaminated water 685. Devices 610, 620, 630, 640 are similar in structure to device 100. Each device has an elongated member 611, 621, 631, 641, respectively, which are connected to the receiving portion of a neighboring cleanup device. With all four devices linked together, system 600 provides a barrier for containing contaminated water 690. System 600 also provides a passive means for collecting and separating oil from the contaminated water. Vessels can periodically visit each device and pump the separated oil out of the container in order to re-use and/or dispose of the oil.

Figure 7:
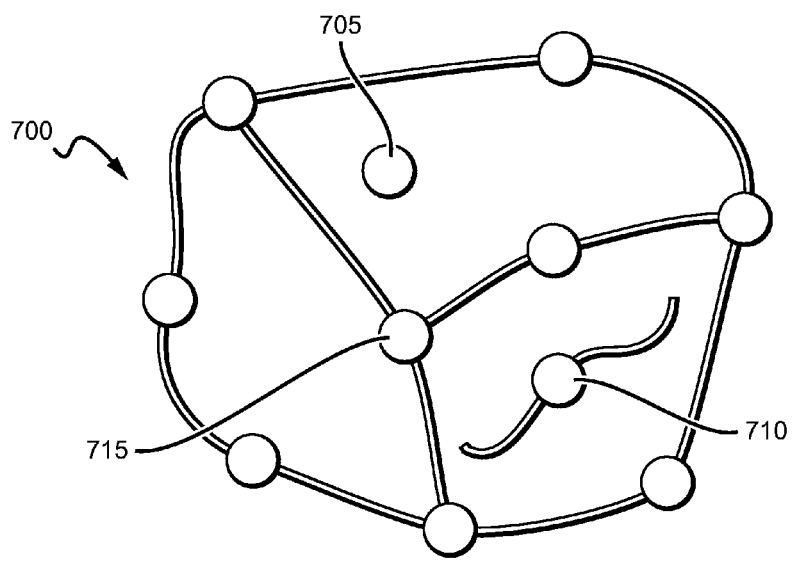
FIG. 7 is an aerial view of a system of oil spill cleanup devices.

FIG. 7 shows an oil container system 700. System 700 is similar to system 600 except that system 700 includes more cleanup devices. In addition, system 700 includes a free-floating oil spill cleanup device 705. Device 705 is not connected to any other cleanup device and is freely floating within the center of system 700. Device 705 has had its elongated member removed, thus exposing an exterior one-way valve (not shown). The valve allows device 705 to collect contaminated water for separation of the oil from the water. System 700 also includes a free-floating oil spill cleanup device 710. Device 710 is different from device 100 in that it has two elongated members extending from its container. Device 710 floats freely within the center of system 700 and helps to collect and separate oil from contaminated water. Those of skill in the art will appreciate that device 710 could include any number of elongated members and receiving portions, according to the specific needs of the cleanup project. For example, device 715 includes three elongated portions that are linked with three other cleanup devices. Device 715 could optionally include an elongated member that branches off and connects with two different devices.

While this application specifically discusses "oil," those of skill in the art will appreciate that the collection device disclosed herein can be used to separate any two liquids having different specific gravities. As such, the methods and devices described herein are not intended to be limited by the terms "oil" and "water."

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

Unless the context dictates the contrary, all ranges set forth herein should be interpreted as being inclusive of their endpoints and open-ended ranges should be interpreted to include commercially practical values. Similarly, all lists of values should be considered as inclusive of intermediate values unless the context indicates the contrary.

It should be apparent to those skilled in the art that many more modifications besides those already described are possible without departing from the inventive concepts herein. The inventive subject matter, therefore, is not to be restricted except in the scope of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . . and N, the text should be interpreted as requiring only one element from the group, not A plus N, or B plus N, etc.

What is claimed is:

1. A device for collecting contaminated water, comprising:
a water-buoyant container that has walls impermeable to water, that defines a lumen and has (i) a first opening on an end of the container, (ii) a first receiving portion configured as an inlet to the water-buoyant container, and (iii) a second receiving portion configured as an inlet to the water-buoyant container;
a first flexible hollow elongated member that removably couples to the first receiving portion of the container and having: (i) a first end; (ii) a first exterior one-way valve; and (iii) a first interior one-way valve; and
wherein upon deploying the device in a body of water, the first and second receiving portions are partially submerged and the first opening is completely submerged.

2. The device of claim 1, wherein the container is cylindrical-shaped.

3. The device of claim 2, wherein the center of gravity of the container is disposed such that the container floats vertically in a body of water.

4. The device of claim 2, wherein the first opening has a diameter that is smaller than the maximum diameter of the cylindrical-shaped container.

5. The device of claim 1, wherein the first receiving portion comprises a first one-way valve and a first fastener.

6. The device of claim 5, wherein the first end of the elongated member includes a second fastener configured to removeably couple with the first fastener.

7. The device of claim 1, wherein the first elongated member comprises a rubber hose.

8. The device of claim 1, wherein the container includes a second opening having a removable cover.

9. The device of claim 8, wherein the second opening is disposed on a portion of an exterior surface of the container located above a resting water level.

10. The device of claim 9, wherein the second opening is configured to removeably couple with a pump.

11. The device of claim 1, further comprising an indicator disposed on an exterior surface of the container and configured to indicate a quantity of oil inside the container.

12. The device of claim 1, further comprising electronics for measuring how much oil has been removed from the container.

13. The device of claim 1, further comprising a second flexible hollow elongated member that couples to the second receiving portion of the container and having: (i) a second end; (ii) a second exterior one-way valve; and (iii) a second interior one-way valve.

14. The device of claim 1, wherein the first elongated member includes a first fin extending along a length of the first elongated member, and having a weight and position that is configured to (i) maintain a desired orientation of the first elongated member in a floating body of water, and (ii) and prevent the contaminated water from passing underneath the elongated member.

15. The device of claim 14, wherein the first elongated member includes a second fin extending along the length of the first elongated member, and having a height and position that is configured to impede water from passing over the elongated member while floating in a turbulent body of water.

16. The device of claim 1, wherein the first elongated member has a second exterior one-way valve and a second interior one-way valve.

17. The device of claim 16, wherein the first interior valve and second interior valve are configured to open in the same direction.

18. The device of claim 16, wherein the first exterior one-way valve and second exterior one-way valve are disposed on opposing surfaces of the first elongated member.

19. The device of claim 1, further comprising a third elongated member that removably couples to at least one of the first and second elongated members.

* * * * *